US012784163B2

(12) United States Patent
Rotzinger

(10) Patent No.: US 12,784,163 B2
(45) Date of Patent: Nov. 3, 2026

(54) METHOD AND SYSTEM FOR DETECTING A CONFIGURATION OF A MODULAR SAFETY CONTROLLER

(71) Applicant: Pilz GmbH & Co. KG, Ostfildern (DE)

(72) Inventor: Florian Rotzinger, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 297 days.

(21) Appl. No.: 18/601,083

(22) Filed: Mar. 11, 2024

(65) Prior Publication Data

US 2024/0311990 A1 Sep. 19, 2024

(30) Foreign Application Priority Data

Mar. 15, 2023 (DE) ..................... 10 2023 106 495.9

(51) Int. Cl.

| | |
|---|---|
| ***G06T 7/00*** | (2017.01) |
| ***G05B 19/042*** | (2006.01) |
| ***G06T 7/70*** | (2017.01) |
| ***G06V 10/75*** | (2022.01) |
| ***G06V 10/764*** | (2022.01) |
| ***G06V 10/86*** | (2022.01) |
| ***G06V 20/50*** | (2022.01) |

(52) U.S. Cl.

CPC ........ *G06T 7/0002* (2013.01); *G05B 19/0428* (2013.01); *G06T 7/70* (2017.01); *G06V 10/75* (2022.01); *G06V 10/764* (2022.01); *G06V 10/86* (2022.01); *G06V 20/50* (2022.01); *G05B 2219/24024* (2013.01); *G06T 2207/30242* (2013.01); *G06V 2201/02* (2022.01)

(58) Field of Classification Search

None

See application file for complete search history.

(56) References Cited

U.S. PATENT DOCUMENTS

| | | | | |
|---|---|---|---|---|
| 8,738,754 B2 * | 5/2014 | Windell | .............. | H04L 41/0686 345/632 |
| 2004/0119735 A1 * | 6/2004 | Subbarao | ............ | H04L 41/0853 715/734 |
| 2008/0015802 A1 * | 1/2008 | Urano | ................ | G01N 21/9501 356/73 |
| 2014/0183254 A1 | 7/2014 | Htay et al. | | |

FOREIGN PATENT DOCUMENTS

| | | | | |
|---|---|---|---|---|
| DE | 102019105688 A1 | 9/2020 | | |
| DE | 102021109399 A1 * | 10/2022 | ......... | G05B 19/4184 |
| EP | 3229175 B1 | 11/2022 | | |

OTHER PUBLICATIONS

Translation for DE 10 2021 109399 A1.*

European Search Report with English translation in European Application No. 24158932.4, dated Jul. 10, 2024, 11 pages.

Office Action with machine translation in German Application No. 10 2023 106 495.9, dated Oct. 31, 2023, 22 pages.

* cited by examiner

*Primary Examiner* — Vikkram Bali

(74) *Attorney, Agent, or Firm* — Edell, Shapiro & Finnan, LLC

(57) ABSTRACT

A method for detecting a configuration of a modular safety controller includes generating a digital image of a module block of the modular safety controller, and evaluating the digital image with an evaluation device using image recognition. A logic code is generated which is compared with a plurality of configuration codes in order to determine the current configuration of the modular safety controller.

13 Claims, 1 Drawing Sheet

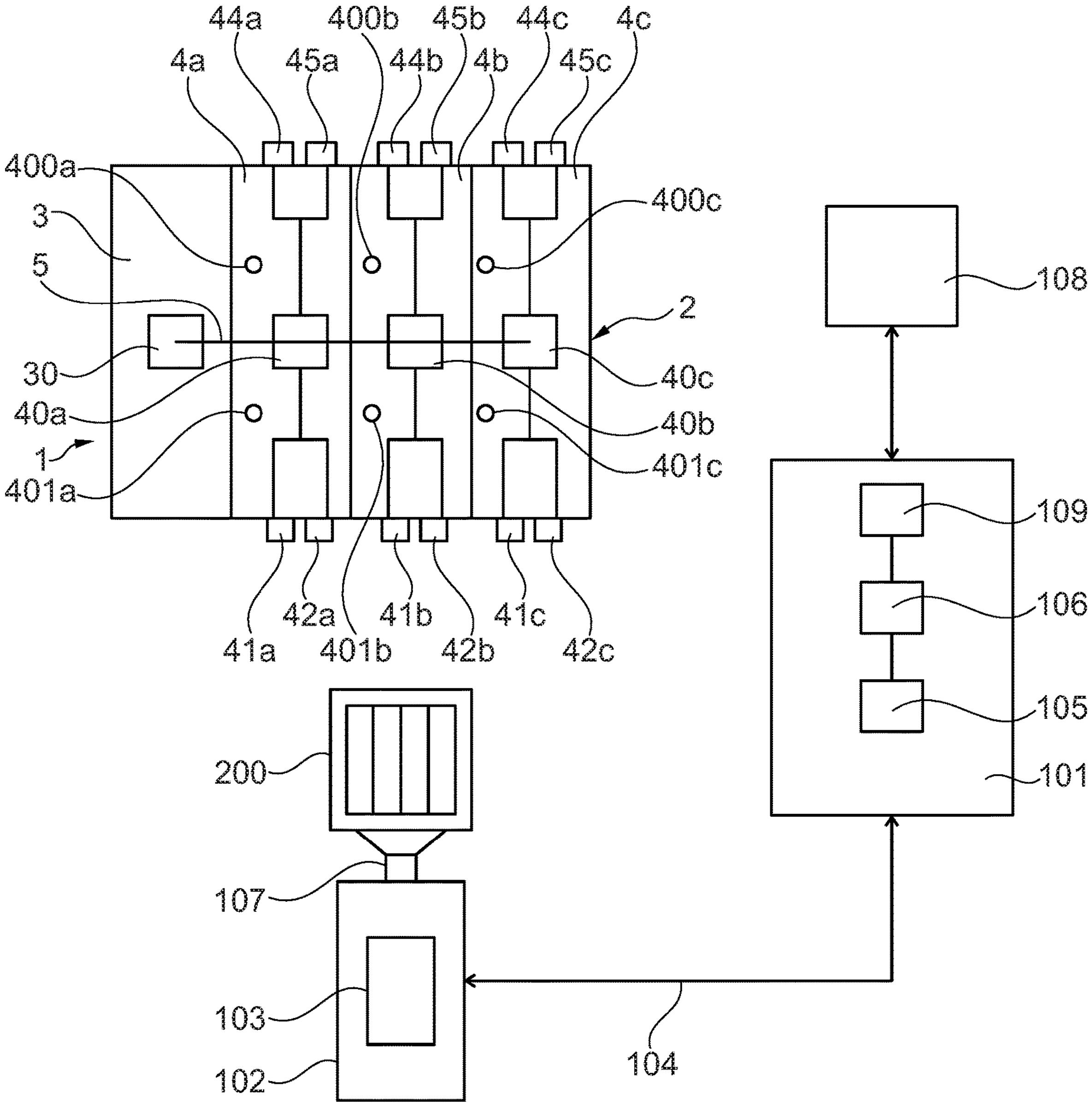
44a
400b
45b
44c
4c
4a
45a
44b
4b
45c
400a
3
5
400c
108
2
30
40c
40a
40b
1
401c
401a
109
106
42a
41b
41c
41a
401b
42b
42c
105
200
101
107
103
104
102

METHOD AND SYSTEM FOR DETECTING A CONFIGURATION OF A MODULAR SAFETY CONTROLLER

CROSS REFERENCE TO RELATED APPLICATIONS

This application claims priority under 35 U.S.C. § 119 (a)-(d) to German application No. 10 2023 106 495.9 filed on Mar. 15, 2023, the entire contents of which are hereby incorporated by reference.

TECHNICAL FIELD

The present disclosure relates to a method and a system for detecting a configuration of a modular safety controller which comprises a module block having a central control module and having a number n≥1 of electronic modules that can be parameterized, wherein the configuration of the modular safety controller can be determined by different types of electronic modules and different positions of the electronic modules within the module block, and wherein the functions of the modular safety controller can be parameterized by setting control elements and/or switching elements of at least one of the modules.

BACKGROUND

Modular safety controllers, in various embodiments, that comply with the EN IEC 61508, EN IEC 62061, and ISO 13849 standards are known from the state of the art. These modular safety controllers are used for the purpose of transferring technical systems or machines reliably and without errors to a state that is safe for people when a hazardous situation occurs. For this purpose, corresponding input signals are received on the input side by a number of safety inputs from signal transmitters or signaling devices, which can, for example, be emergency off switches, emergency stop switches, photo-electric guards, light curtains, pressure-sensitive mats, safety door position switches, 3D laser scanners, etc., and which safety inputs are reliably evaluated by a control unit. On the output side, corresponding safety outputs of an output circuit are actuated. When a hazardous situation occurs, actuators such as contactors, valves etc. are controlled with output signals by these safety outputs such that the connected machine(s) or technical system connected to these actuators can be transferred to a state that is not dangerous for people.

An important element of a modular safety controller is a central control module, which comprises the control unit and a non-volatile memory instrument, in which, in particular, the software for the operation of the modular safety controller is stored in a retrievable manner, which software is executed by the control unit during operation.

Modular safety control systems, moreover, comprise a plurality of electronic modules that are arranged together with the central control module in at least one series of modules and provide certain functions, in particular safety-related functions. The central control module and the electronic modules are electrically and mechanically connected to each other in a suitable manner during assembly and form a module block, wherein the central control module forms the head of the series of modules and is therefore often also referred to as the head module.

The modular construction of a safety controller achieves the possibility in an advantageous manner of providing an application-specific configuration by individually assembling several electronic modules, wiring them together and configuring and parameterizing them such that they can provide the desired functions, in particular also safety functions. Examples of electronic modules that can be used to build modular safety controllers with very different safety functions include, among other, input modules that can receive and process, if necessary, input signals from one or a plurality of signal transmitters, such as input signals from sensors or emergency command devices, output modules that can emit output signals to one or a plurality of actuators connected to them, combined input and output modules (so-called I/O modules), control modules that can control the assignment of input modules to output modules, as well as interface modules, communication modules, fieldbus controllers, fieldbus couplers, etc. In the manufacture of the modular safety controller, the electronic modules are strung together in at least one series of modules and wired accordingly and configured and parameterized such that they can provide the functions required for the specific application purpose, particularly from a safety perspective.

The application-specific configuration of a modular safety controller can, for example, be created using a software-based configuration tool. A graphical user interface of the configuration tool enables simple and intuitive operation of the configuration tool. The user can undertake interactive user entries and, for example, define corresponding logic requirements that are placed on the modular safety controller. During the configuration process, the user can also, for example, select certain signal transmitters or signaling devices present in the system to be controlled or in the area of the machine, such as emergency off or emergency stop buttons, safety doors, photo-electric guards, etc., or sensors the input signals of which must be reliably evaluated, as well as actuators that must be reliably controlled. This means that the safety inputs and safety outputs of the modular safety controller can, in particular, be configured using the configuration tool.

The properties of the central control module as well as of the electronic modules can be defined by hardware settings of mechanically actuated control elements, so that the functions of the central control module as well as of the electronic modules can be parameterized accordingly. These control elements can preferably be rotary encoders, which can be configured in particular as potentiometers. The hardware settings include, for example, setting the rotary positions of one or a plurality of rotary encoders, in particular potentiometers, of the central control module as well as of the electronic module. The rotary positions of the rotary encoders of the electronic modules can be used, in particular, to set switch-on and/or switch-off delays for the actuators connected to the relevant electronic modules. The hardware settings can, moreover, also include the setting of switching positions of one or a plurality of switching elements of the central control module and/or the electronic modules, wherein the switching elements are not configured as rotary encoders. DIP switches are non-exhaustive examples of such switching elements that can be used for parameterizing the central control module and the electronic modules.

During configuration, the user can specify the switching positions of the mechanically actuated control elements and switching elements, in particular, the rotary positions of the rotary encoders and the positions of the DIP switches, so that these switching positions can already be set by the manufacturer when the modular safety controller is manufactured. This eliminates the need for additional settings when commissioning the modular safety controller.

The individual configuration and parameterization of the modular safety controller for the specific safety application takes place on the basis of the selected module types, their sequence in the at least one series of modules of the module block and the respective parameter settings. An unambiguous machine-readable configuration code can be generated for the hereby resulting configuration of the modular safety controller, which can be stored as a dataset in a non-volatile storage medium for retrieval. This unambiguous configuration code can be used in electronic documentation for the modular safety controller or, in the event of a defect, also as an order code for the procurement of a replacement.

One advantage of modular safety controllers is that the configuration can be changed very easily, for example, by replacing one or a plurality of electronic modules and/or by adding one or a plurality of electronic modules. It is therefore essential that every actual change to the configuration and, if necessary, any changes to the parameterization of the modular safety controller during the entire life cycle are also recorded in the digital documentation of the modular safety controller.

In order to transfer such changes to the digital documentation without errors, it is desirable to embed the verification of the changes in a workflow that is as automated as possible. A major source of error here is the precise determination of the changed configuration and parameterization of the modular safety controller. This leads to the task of how the current configuration or all configuration changes and parameterization changes to the modular safety controller can be determined and documented by a user as efficiently and error-free as possible.

SUMMARY

To solve this task, a method is disclosed for detecting a configuration of a modular safety controller that comprises a module block having a central control module and having a number n≥1 of parameterizable electronic modules, which modules are selected from a plurality of available module types, wherein the configuration of the modular safety controller can be determined by different types of electronic modules and different positions of the electronic modules within the module block and wherein the functions of the modular safety controller can be parameterized by setting control elements and/or switching elements of at least some of the electronic modules. The method comprises the following steps:

- provisioning a plurality of unambiguous configuration codes that represent different configurations and parameterizations of a plurality of different modular safety controllers,
- generating a digital image of the module block of the modular safety controller by a camera-based image generating device on the basis of one or a plurality of images or image sequences of the module block generated by a camera device of the image generating device,
- transmitting the digital image to an evaluation device, wherein an evaluation algorithm is executed by the evaluation device, which algorithm captures, through image recognition, the selected module types, the positions of the central control module and of the electronic modules within the module block and the settings of the control elements and/or switching elements of each of the electronic modules and of the central control module and it generates an unambiguous logic code from the information obtained therefrom, which logic code represents the current configuration and parameterization of the module block of the modular safety controller,
- comparing the unambiguous logic code generated in the previous step with the provided unambiguous configuration codes to identify the current configuration and parameterization of the module block of the modular safety controller, wherein an identification dataset is generated if the logic code matches one of the configuration codes, and wherein an error code is generated if the logic code does not match any of the configuration codes, and
- outputting the identification dataset and/or an image obtained from the identification dataset if the logic code matches one of the configuration codes, or output of the error code if the logic code does not match any of the configuration codes.

The disclosed method advantageously enables the automated detection of the different module types, the number and the sequence of all installed individual modules within the module block of the modular safety controller as well as their parameterization in the installed state. In so doing, the selection and arrangement of the electronic modules describe the basic functional principle (circuit construction) and the parameterization of the electronic modules and, if necessary, also describe the mode of operation of the central control module.

The configuration detection performed with the aid of the disclosed method offers numerous advantages for the user. The timeliness of the configuration and parameterization information should, in particular, be mentioned here. The digital image and thereby also the documentation of the modular safety controller are always up-to-date. The configuration detection and the transmission of configuration information advantageously take place in an automated process in order to rule out any errors in the digital documentation of the modular safety controller. This also results in corresponding advantages in terms of efficiency and user-friendliness An always up-to-date, standardized, traceable and error-proof documentation of the configuration and parameterization changes to the modular safety controller can be based on or alternatively fulfill any compliance requirements and/or quality management requirements, in particular with regard to error-proofing and/or occupational safety.

It can also be ensured by the method presented here that only a single module block is captured. The start of each module block is defined by the unequivocally identifiable central control module (head module). The end of the respective module block is clearly recognizable due to the fact that the individual module blocks are not directly adjacent to each other when installed. The lower and upper system boundaries can likewise be unambiguously identified on the basis of the geometric shape of the individual modules. The start of a new module block is identified by a central control module assigned to it.

It is proposed in one embodiment that, preferably during the step of generation of the digital image, an analysis axis is captured which can be used to determine whether the individual modules of the module block are arranged next to each other in the horizontal direction or one above the other in the vertical direction. Preferably, the capture of the analysis axis can be carried out by determination of the installation position of the central control module within the module block. A directional axis can be defined from the analysis axis, which determines the direction of the sequential modular construction of the modular safety controller.

In one embodiment, there is the possibility that the number of modules within the module block is determined, preferably during the step of generation of the digital image. Preferably, defined distances between the individual modules of the module block can be captured for determination of the number of modules of the module block.

In an advantageous embodiment, it is provided that during the step of generation of the digital image, a plurality of specific recognition features of the modules within the module block and all parameterizations of the modules are captured. These specific recognition features include, in particular, the geometric structure of the modular safety controller, which is given by the series of modules within the module block, as well as additional visually, descriptive representations that can be captured, such as color schemes, coding, patterns, optical signal codes, such as blinking/flashing LEDs, which may have certain timing or flashing patterns and/or color changes, as well as the positions of the control elements (rotary encoder positions, in particular potentiometer positions) and the positions of the switching elements and other buttons or the like that may be provided. To ensure that all specific recognition features of a module block are captured, it must be captured as a whole so that all system boundaries are recognizable on the final digital image. If individual specific recognition features cannot be recognized unambiguously, it is possible, for example, to use the camera device to generate additional detailed images with details of the module block, which detailed images may be included in the creation of the digital image.

In one embodiment, it may be provided that the capture of the specific recognition features and parameterizations of the modules within the module block is carried out in a single step for the entire module block.

In an alternative embodiment, it is possible that the capture of the specific recognition features and parameterizations of the modules within the module block is carried out module by module in several steps and thus in a cascading manner.

In one embodiment, it is provided that the image recognition is carried out by an image comparison of the digital image with a plurality of images which are stored in a retrievable manner, in particular in a database.

Preferably, the image recognition can be carried out by an image comparison of the digital image with the plurality of images module by module. Since an image comparison is very time-consuming due to a large number of configuration options and parameterization options of the individual modules, an evaluation method is therefore advantageously used which permits a cascading image comparison and thus module by module. A method for reducing the number of variants can also, preferably, be carried out here, in which, for example, one or a plurality of dominant recognition features are defined. In general, there is the possibility to use one or a plurality of detailed images of certain characteristic areas of the modular safety controller for validation.

In an alternative embodiment, there is the possibility for the image recognition to be carried out by a simulation and/or by calculations on the basis of image segments of the digital image.

In an advantageous embodiment, it may be provided that the identification dataset and/or the image obtained from the identification dataset is visualized by a display device, if the logic code matches one of the configuration codes or matches the error code, if the logic code does not match any of the configuration codes.

On the basis of the digital image of the modular safety controller, the method presented here identifies the configuration and parameterization of the entire module block of the modular safety controller. Preferably, both the current configuration and parameterization of the module block and the possible deviations of the current configuration and parameterization of the module block from the original factory settings, as well as the entire change history, are output and visualized by the display device. Preferably, it is also possible to output indications of possible misconfigurations and/or configuration changes (either configuration changes that have already been made or configuration changes that still need to be made) and to visualize them using the display device.

A system for detection of a configuration of a modular safety control according to the disclosure comprises an evaluation device, a camera-based image generating device as well as a display device, wherein the system is adapted to perform the disclosed detection methods.

The camera-based image generating device is configured to generate a digital image of the module block of the modular safety control and comprises a camera device that can generate one or a plurality of images or image sequences, in particular video sequences, of the module block. The image generating device can be, for example, a cell phone or a tablet PC or a smart camera for industrial image processing or VR glasses.

The display device can preferably be integrated into the image generating device.

BRIEF DESCRIPTION OF THE DRAWINGS

Further features and advantages of one embodiment of the disclosed method and system are described below with reference to the drawing.

FIG. 1 shows a schematically highly simplified representation of a system for carrying out a method for detection of a configuration of a modular safety control.

DETAILED DESCRIPTION

A modular safety controller 1 has a module block 2 having a central control module 3 and having a number n≥1 of parameterizable electronic modules 4*a*-4*c*. To simplify the following description, it is assumed that the modular safety controller 1 has a number n=3 of parameterizable electronic modules 4*a*-4*c*. The modular safety controller 1 is configured such that it complies with the EN IEC 61508, EN IEC 62061 and ISO 13849 standards.

The configuration of the modular safety controller 1 can be determined by different available electronic module types, from which the electronic modules 4*a*-4*c* can be selected for specific applications, and by different positions of the electronic modules 4*a*-4*c* within the module block 2. The functions of the modular safety controller 1 can, for example, be parameterized through the setting of control elements 400*a*, 401*a*, 400*b*, 401*b*, 400*c*, 401*c*, in particular rotary encoders, of the electronic modules 4*a*-4*c* and, where appropriate, through the setting of any provided switching elements of the electronic modules 4*a*-4*c*. The possibility also exists for the central control module 3 to comprise corresponding control elements 400*a*, 401*a*, 400*b*, 401*b*, 400*c*, 401*c* and/or switching elements. For reasons of simplification, it is assumed below that each of the electronic modules 4*a*-4*c* has two control elements 400*a*, 401*a*, 400*b*, 401*b*, 400*c*, 401*c* that can be actuated mechanically, which are preferably configured as rotary encoders, in particular as potentiometers.

The central control module 3 comprises a processor-based control unit 30 and a non-volatile memory instrument, not explicitly shown here, in which, in particular, software for the operation of the modular safety controller 1 is stored in a retrievable manner, which software is executed by the control unit 30 during operation.

The electronic modules 4*a*-4*c* are arranged together with the central control module 3 in at least one series of modules and thus form the module block 2. The control module 3 and the electronic modules 4*a*-4*c* are electrically and mechanically connected to each other in a suitable manner during assembly, wherein the central control module 3 forms the head of the module block 2 and is therefore often also referred to as the head module.

The modular construction of the safety controller 1 shown here advantageously creates the possibility of an application-specific configuration in that the electronic modules 4*a*-4*c* are individually assembled from a plurality of different available electronic modules 4*a*-4*c*, wired together and parameterized such that they can provide the desired functions, in particular also safety-related functions.

Examples of electronic modules 4*a*-4*c*, by which the modular safety controller 1 can be provided with completely different functions, in particular also safety-related functions, include input modules with safety inputs, that can receive and process, if necessary, input signals from one or a plurality of signal transmitters, such as input signals from sensors or emergency command devices, output modules with safety outputs that can emit output signals to one or a plurality of actuators connected to them, combined input and output modules (so-called I/O modules) with safety inputs and safety outputs, control modules that can control the assignment of input modules to output modules, as well as interface modules, communication modules, fieldbus controllers, fieldbus couplers, etc. This list is not to be understood to be exhaustive.

In the manufacture of the modular safety controller 1, the central control module 3 and the electronic modules 4*a*-4*c* are strung together in at least one series of modules and wired accordingly and parameterized such that they can provide the functions, in particular also safety-related functions, required for the specific application purpose from a safety point of view.

A communication connection 5 is provided for bidirectional communication between the central control module 3 and the electronic modules 4*a*-4*c*, which connection is preferably realized as a serial BUS connection. The BUS connection can be a proprietary solution. However, it is often advantageous to use a standardized BUS connection, such as CAN-BUS, PROFIBUS or IO-Link. It is also particularly advantageous to configure the communication connection 5 such that it is fail-safe. The electronic modules 4*a*-4*c* respectively have their own control unit 40*a*, 40*b*, 40*c* in order to be able to participate in the communication via the communication link 5. Preferably, the control units 40*a*, 40*b*, 40*c* can be configured such that they can themselves take over certain evaluation tasks. The control units 40*a*, 40*b*, 40*c* can, for example, be microprocessors or logic modules.

This modular safety controller 1 is used, in particular, for the purpose of transferring, reliably and without errors, at least one machine connected to it to a state that is safe for people when a hazardous situation occurs. For this purpose, corresponding input signals are received and reliably evaluated on the input side by a number of safety inputs 41*a*, 42*a*, 41*b*, 42*b*, 41*c*, 42*c* from signal transmitters or signaling devices, which can, for example, be emergency off switches, emergency stop switches, photo-electric guards, light curtains, pressure-sensitive mats, safety door position switches, 3D laser scanners, etc. On the output side, corresponding safety outputs 44*a*, 45*a*, 44*b*, 45*b*, 44*c*, 45*c* of an output circuit are actuated. When a hazardous situation occurs corresponding actuators, such as contactors, valves, etc., are controlled with output signals by these safety outputs 44*a*, 45*a*, 44*b*, 45*b*, 44*c*, 45*c* such that the at least one machine connected to these actuators can be transferred to a state that is not dangerous for people.

The modular safety controller 1 is configured such that it complies with the EN IEC 61508, EN IEC 62061 and ISO 13849 standards. This includes in particular that the control unit 30 of the central control module 3, the safety inputs 41*a*, 42*a*, 41*b*, 42*b*, 41*c*, 42*c* and the safety outputs 44*a*, 45*a*, 44*b*, 45*b*, 44*c*, 45*c* are configured to be fail-safe.

To simplify the further description, it will be assumed below that all three electronic modules 4*a*, 4*b* and 4*c* of the modular safety controller 1 shown in FIG. 1 respectively have two safety inputs 41*a*, 42*a*, 41*b*, 42*b*, 41*c*, 42*c* and two safety outputs 44*a*, 45*a*, 44*b*, 45*b*, 44*c*, 45*c*.

The application-specific configuration of the modular safety controller 1 shown here can, for example, be created using a software-based configuration tool. A graphical user interface of the configuration tool enables simple and intuitive operation of the configuration tool. The user can undertake interactive user entries and, for example, define corresponding logic requirements that are placed on the modular safety controller 1. During the configuration process, the user can also, for example, select certain signaling devices present in the system to be controlled or alternatively in the area of the machine, in particular signaling devices, such as emergency off or emergency stop buttons, safety doors, photo-electric guards, etc., or sensors the input signals of which must be reliably evaluated, as well as actuators that must be safely controlled with the output signals. This means that the safety inputs 41*a*, 42*a*, 41*b*, 42*b*, 41*c*, 42*c* and the safety outputs 44*a*, 45*a*, 44*b*, 45*b*, 44*c*, 45*c* of the modular safety controller 1 can be configured using the configuration tool. The functional properties of the electronic modules 4*a*-4*c* and, if applicable, the central control module 3 can be defined by hardware settings of the mechanically actuated control elements 400*a*, 401*a*, 400*b*, 401*b*, 400*c*, 401*c* and/or the mechanically actuated switching elements.

The hardware settings that can be made for parameterization thereby include, in particular, the setting of rotary positions of the mechanically operable control elements 400*a*, 401*a*, 400*b*, 401*b*, 400*c*, 401*c* of the electronic module 4*a*-4*c* and of the central control module 3. The rotary positions of the control elements 400*a*, 401*a*, 400*b*, 401*b*, 400*c*, 401*c* (rotary encoders, in particular potentiometers) can be used, for example, to set start conditions, switching times, switch-on and/or switch-off delays for the actuators connected to the relevant electronic modules 4*a*-4*c*, as well as sensor types and their properties can be used as functional parameters and thus parameterize them. The hardware settings can moreover also include the setting of switching positions of one or a plurality of switching elements of the electronic module 4*a*-4*c* and possibly also of the central control module 3, wherein these switching elements are not configured as rotary encoders. DIP switches are non-exhaustive examples of such switching elements that can be used for parameterizing the electronic modules 4*a*-4*c* and possibly also the central control module 3. A user can specify the positions of the mechanically actuated control elements 400*a*, 401*a*, 400*b*, 401*b*, 400*c*, 401*c* and switching elements during configuration, so that the corresponding settings can already be made by the manufacturer when the modular safety controller 1 is manufactured. This eliminates the need for additional settings when commissioning the modular safety controller 1.

During the software-based configuration of the modular safety controller 1, an unambiguous configuration code is generated and stored as a dataset in a suitable manner in a non-volatile memory device, wherein this configuration code represents the configuration of the module block 2 and all parameterizations undertaken. Preferably, a serial number of the modular safety controller 1 is also assigned to the unambiguous configuration code. If this unambiguous configuration code is read out and decoded at a later time, the configuration and all parameterizations made to the modular safety controller 1 can be restored and assigned to the relevant modular safety controller 1 via the serial number.

A system 100, by which a method for detection of the configuration of the modular safety controller 1 can be carried out, comprises an evaluation device 101, a camera-based image generating device 102 and a display device 103.

The camera-based image generating device 102 is configured to generate a digital image 200 of the module block 2 of the modular security circuit 1. The image generating device 102, which is used to generate this image 200, comprises a camera device 107, which can generate one or a plurality of images or image sequences, in particular video sequences, of the module block 2. The image generating device 102 can be, for example, a cell phone or a tablet PC or a smart camera for industrial image processing or VR glasses. In principle, the image 200 of the module block 2 can also be generated by processing acoustic signals that are captured by the image generating device 102.

The display device 103 is preferably (but not necessarily) integrated into the image generating device 102.

An image capture software of the image generating device 102, which is used for generating the image 200 of the module block 2, is configured such that it can geometrically capture the module block 2 on the basis of one or a plurality of images or image sequences, in particular video sequences, which are generated (recorded) by the camera device 107, and can preferably recognize all configuration features of the module block 2 and all parameterizations made by a cascading, in particular module-by-module, capture thereof.

The assurance of the configuration and parameterization detection of the module block 2 depends substantially on a set of mutually non-interdependent, specific recognition features, which in particular map the logical dependencies. These specific recognition features are, for example, the geometric structure of the modular safety controller 1, which is given by the arrangement of the central control module 3 and the other electronic modules 4*a*-4*c* within the module block 2, as well as additional visually capturable, descriptive representations, such as special color schemes, coding, patterns, optical signal codes, such as flashing or blinking LEDs, which can have different timing and/or flashing patterns and/or color changes, as well as the positions of the control elements 400*a*, 401*a*, 400*b*, 401*b*, 400*c*, 401*c* and the switching elements, which represent the respective parameterizations.

The image capturing software of the image generating device 102 provides the necessary recording methods for creating the digital image 200 on the basis of one or a plurality of images or image sequences of the camera device 107 and for reliably capturing the specific recognition features of the module block 2 and can thereby create the digital image 200. Subsequently, the digital image 200 is transmitted from the image generating device 102 to the evaluation device 101 via a communication link 104, which transmission is preferably executed wirelessly.

The evaluation device 101 comprises a processor 109, a non-volatile memory instrument 105 and a volatile memory instrument 106. An evaluation algorithm is stored within the non-volatile memory instrument 105, which algorithm is loaded into the volatile memory instrument 106 and executed by the processor 109 when the method is carried out.

Further details of the method for detection of the configuration of the modular safety controller 1 will be elucidated in more detail below.

When carrying out the method, a plurality of unambiguous configuration codes of different modular safety controllers 1 are initially provided, wherein the configuration codes represent different configurations and parameterizations of a plurality of different safety controllers 1. These unambiguous configuration codes are stored as datasets in a non-volatile memory device, which can be accessed by the evaluation device 101. This non-volatile memory device may, for example, be the non-volatile memory instrument 105 of the evaluation device 101 itself, so that the storage of the configuration codes is carried out centrally. Alternatively or additionally, there is also the possibility for the storage of the configuration codes to take place in a decentralized manner, in particular in a cloud memory 108 or in a server device.

In a next step, the digital image 200 of the module block 2 of the modular safety controller 1 is generated by the image generating device 102 on the basis of one or a plurality of images or image sequences of the camera device 107. With the aid of the image capture software of the image generating device 102, a capture of an analysis axis is preferably carried out first, which can be used to determine whether the individual modules of the module block 2 are arranged next to each other in the horizontal direction or alternatively one above the other in the vertical direction. Preferably, the position of the clearly recognizable central control module 3 is captured for this purpose. This allows the installation direction of all modules of the modular safety controller 1 to be determined.

The image capture software of the image generating device 102 then identifies the number of modules within the module block 2. This can be done, for example, by capturing defined distances (gaps) between the individual modules of module block 2.

Subsequently, the specific recognition features of the modules 3, 4*a*-4*c* within the module block 2 and all parameterizations of the modules 3, 4*a*-4*c* within the module block 2 are captured, so that the digital image 200 of the module block 2 can then be created. The recognition features and parameterizations can be captured in a single step for the entire module block 2. In an advantageous manner, however, the recognition features and parameterizations of the modules 3, 4*a*-4*c* can also be captured module by module and thus in a cascading manner within the module block 2.

There is a possibility that individual areas of the module block 2 cannot be unambiguously identified or alternatively assigned on the basis of the generated image 200. To remedy this problem and enable a correction, the image 200 is displayed to the user by the display device 103. The areas in the image 200 that cannot be evaluated unambiguously are visualized or marked. The user can then generate an additional detailed image of these areas using the camera device 107 of the image generating device 102, which then is incorporated into the further evaluation.

The digital image 200 of the module block 2 of the modular safety controller 1 created by the image generating device 102, which in addition to pure image information can preferably also include additional meta data obtained during the creation of the digital image 200, is subsequently transmitted to the evaluation device 101 by the communication link 104 and stored in the volatile memory instrument 106.

An evaluation algorithm is executed by the evaluation device 101 which uses image recognition to capture and evaluate, the positions of the central control module 3 and the electronic modules 4*a*-4*c* within the module block 2 in the digital image 200, the types of module used and all parameter settings of each of the electronic modules 4*a*-4*c* and of the central control module 3 and it generates an unambiguous logic code from the information generated, which represents the current configuration and parameterization of the entire module block 2 of the modular safety controller 1.

The image recognition can be performed by a comparison of an image with a plurality of images that are stored, for example, in a database stored in a retrievable manner within the non-volatile memory instrument 105 of the evaluation device 101 or in the cloud memory 108. Since an image comparison of the entire image 200 of the module block 2 would be relatively complex due to the large number of possible configurations and parameterizations, it is advantageous to carry out the image comparison module by module and therefore in a cascading manner. In order to evaluate the digital image 200 of the module block 2, the configuration of the module block 2 or the wiring logic is then analyzed module by module on the basis of the arrangement of the recognition features of the central control module 3 and the electronic modules 4*a*-4*c* using the image comparison. Subsequently, the respective parameterizations of the central control module 3 and the electronic modules 4*a*-4*c* are also identified, including by an image comparison, on the basis of the positions of the control elements 400*a*, 401*a*, 400*b*, 401*b*, 400*c*, 401*c* and any switching elements present, which result from the image 200. The parameterizations of the central control module 3 and the electronic modules 4*a*-4*c* are preferably also captured module by module.

As an alternative to an image comparison, the image recognition can also be performed by a simulation and/or by calculations on the basis of image segments of the digital image 200.

Alternatively, the possibility also exists that the image recognitions described above are already executed by the image generating device 102, provided that the computing power of the image generating device 102 is sufficient for this.

As already mentioned, after the analysis of the digital image 200 of the module block 2, the resulting information is transformed into the unambiguous logic code, which represents the current configuration and the current parameterization of the module block 2 of the modular safety controller 1 and is stored in the non-volatile memory instrument 105 of the evaluation device.

In a further method step, the logic code is then compared with the provided configuration codes for identification of the current configuration and parameterization of the module block 2 of the modular safety controller 1, wherein an identification dataset is generated by this comparison if the logic code matches one of the stored configuration codes, and wherein an error code is generated if the logic code does not match any of the stored configuration codes.

Subsequently, the identification dataset and/or an image generated from the identification dataset are then displayed by the display device 103 if the logic code matches one of the stored configuration codes. If the logic code does not match any of the configuration codes, the error code is displayed by the display device 103. Preferably, a comparison of the expected image of the module block 2 with the actual digital image 200 can be visualized from the identification dataset. Alternatively or additionally, the course of change over time of the configuration and the parameterization of the module block 2 of the modular safety circuit 1 can be determined and visualized by the display device 103.

The logic code can preferably be stored, for documentation purposes, in a retrievable manner together with the digital image 200 and the associated serial number of the modular safety controller 1 in the non-volatile memory instrument 105 of the evaluation device 101 and/or in the cloud memory 108 and/or in a server device.

The configuration detection presented here advantageously ensures that the real existing configuration and parameterization of the module block 2 of the modular safety controller 1 is congruently mapped at all times in a "digital twin," in the form of the digital image 200 and the logic code generated therefrom, which represents the current configuration and parameterization of the module block 2 of the modular safety controller 1.

Numerous advantages result from the method presented here, for example, when modules are replaced, when the original configuration is modified, when regular verifications are carried out, and when faults and defects are diagnosed.

Replacement of Modules
- Verification whether the "digital twin" in the form of the digital image 200 matches reality,
- Assurance that parameterizations made during operation are also taken into account in a replacement module.

Modification of the Originally Created Configuration
- Verification as to whether a user is authorized to carry out certain reconfigurations,
- Documentation of reconfigurations (in particular the type, user, time, justification),
- Updating of the "digital twin" in the form of the digital image 200,
- If necessary, plausibility check against a higher-level/complementary security system/security design,
- "Learning" from the reconfigurations/the replacement of modules in the field for the engineering phase or alternatively as guidelines for similar safety control systems in the field.

Execution of Scheduled Verifications
- Verification as to whether the current construction/actuality corresponds to the type code printed on the modular safety controller 1.

Diagnosis of Faults and Defects
- Identification of deviations between recognized settings of the control elements 400*a*, 401*a*, 400*b*, 401*b*, 400*c*, 401*c* and/or the switching elements and the associated control function (for example, an encoder is not engaged or is defective),
- Identification of critical settings of the control elements 400*a*, 401*a*, 400*b*, 401*b*, 400*c*, 401*c* and/or the switching elements (for example, an encoder is set to a value that is critical in terms of safety or for associated/complementary objects).

What is claimed is:

1. A method for detecting a configuration of a modular safety controller that comprises a module block having a central control module and a number n≥1 of parameterizable electronic modules that are selected from a plurality of available module types, wherein the configuration of the modular safety controller is determinable by different types of electronic modules and different positions of the electronic modules within the module block and wherein functions of the modular safety controller are capable of being parameterized by setting control elements and/or switching elements of at least some of the electronic modules, the method comprising:

provisioning a plurality of unambiguous configuration codes that represent different configurations and parameterizations of a plurality of different modular safety controllers;

generating a digital image of the module block of the modular safety controller by a camera-based image generating device based on one or more images or image sequences of the module block generated by a camera device of the image generating device;

transmitting the digital image to an evaluation device configured to execute an evaluation algorithm that captures, through image recognition, the selected module types, positions of the central control module and the electronic modules within the module block, and settings of the control elements and/or switching elements of each of the electronic modules and of the central control module and generates an unambiguous logic code from information obtained therefrom, the unambiguous logic code representing a current configuration and parameterization of the module block of the modular safety controller;

comparing the unambiguous logic code with the unambiguous configuration codes to identify the current configuration and parameterization of the module block of the modular safety controller, wherein an identification dataset is generated if the logic code matches one of the configuration codes, and wherein an error code is generated if the logic code does not match any of the configuration codes, and outputting the identification dataset and/or an image obtained from the identification dataset if the logic code matches one of the configuration codes, or outputting the error code if the logic code does not match any of the configuration codes.

2. The method of claim 1, wherein generating the digital image includes capturing an analysis axis usable to determine whether individual modules of the module block are arranged next to one another in a horizontal direction or one above another in a vertical direction.

3. The method of claim 2, wherein capturing the analysis axis is carried out by determination of an installation position of the central control module within the module block.

4. The method of claim 1, wherein generating the digital image includes determining the number of modules within the module block.

5. The method of claim 4, wherein determining the number of modules of the module block includes capturing defined distances between individual modules of the module block.

6. The method of claim 1, wherein generating the digital image includes capturing a plurality of specific recognition features of the modules within the module block and all parameterizations of the modules.

7. The method of claim 6, wherein capturing the specific recognition features and parameterizations of the modules within the module block is carried out in a single step for an entirety of the module block.

8. The method of claim 6, wherein capturing the specific recognition features and parameterizations of the modules within the module block is carried out module by module in several steps.

9. The method of claim 8, wherein the image recognition is carried out by simulation and/or by calculations based on image segments of the digital image.

10. The method of claim 1, wherein the image recognition is carried out by an image comparison of the digital image with a plurality of images stored in a database.

11. The method of claim 10, wherein the image comparison is carried out module by module.

12. The method of claim 1, wherein the identification dataset and/or the image obtained from the identification dataset are visualized by a display device if the logic code matches one of the configuration codes, or matches the error code if the logic code does not match any of the configuration codes.

13. A system for detecting a configuration of a modular safety controller, comprising:

an evaluation device;

a camera-based image generating device; and a display device, wherein the system is configured to perform the method of claim 1.

* * * * *